United States Patent Office 3,538,042
Patented Nov. 3, 1970

3,538,042
EPOXY RESIN MOULDING COMPOSITIONS CONTAINING PHENOLPHTHALEIN EPOXY RESIN
Ewald Forster, Binningen, Switzerland, assignor to Ciba Limited, Basel, Switzerland, a company of Switzerland
No Drawing. Continuation-in-part of application Ser. No. 519,184, Jan. 7, 1966. This application July 18, 1969, Ser. No. 843,222
Claims priority, application Switzerland, Jan. 18, 1965, 673/65
Int. Cl. C08g 51/02
U.S. Cl. 260—37   4 Claims

ABSTRACT OF THE DISCLOSURE

Moulding compositions of good electrical and mechanical properties and excellent shelf life are provided by epoxy resin compositions in which the epoxy resin component comprises the reaction product of an epihalohydrin with the condensation product of a phenol and a cyclic dicarboxylic acid anhydride together with a curing agent and a filler.

CROSS-REFERENCES TO RELATED APPLICATIONS

This application is a continuation-in-part of our application Ser. No. 519,184, filed Jan. 7, 1966 and now abandoned.

BACKGROUND OF THE INVENTION

Epoxy resin moulding compositions based on conventional epoxy resins, for example polyglycidyl ethers of Bisphenol A, are known. Mouldings manufactured therefrom are distinguished by particularly good electrical and mechanical properties. However, compared with the known moulding compositions based on phenolic resins, urea resins or melamine resins they have the disadvantage that they have a much shorter shelf life. As a result they can often, especially in warm weather, be transported from the manufacturer of the moulding composition to the consumer only in special, cooled containers. Most moulding works have special refrigerators for storing the moulding compositions before moulding them.

It has now unexpectedly been found that moulding compositions having an excellent shelf life are obtained with the identical curing systems as used for epoxy moulding compositions based on conventional epoxy resins by using as epoxy resin component the reaction products of an epihalohydrin with the condensation product obtained from a phenol and a cyclic anhydride, especially a cyclic dicarboxylic acid anhydride. The manufacture of such epoxy resins and their curing leading to castings or lacquer films with the use of the conventional curing agents has been described in German Pat. No. 1,132,728, granted Jan. 3, 1963 to Johnson & Johnson, New Jersey, U.S.A. and in U.S. Pat. No. 3,015,647, patented Jan. 2, 1962, by Elizabeth S. Lo. However, these previous publications neither disclose nor suggest to the expert the use of the epoxy resins concerned in moulding compositions. Nor do they contain any reference to the unexpectedly valuable properties of these epoxy resins which make them particularly suitable for use in the manufacture of moulding compositions. The discovery of these valuable properties was, however, the prerequisite for the present, novel, inventive technical proposal to use this type of epoxy resin in moulding compositions.

Accordingly, the present invention provides curable moulding compositions containing epoxy resins, curing agents and preferably also fillers, the epoxy resin used being a polyglycidyl compound obtained by reacting an epihalohydrin in an alkaline medium with a condensation product of a phenol with a cyclic anhydride or a dibasic acid capable of forming such a cyclic anhydride under the reaction conditions.

The polyglycidyl compounds to be used in this invention are as a rule manufactured with the use of 2 to 15 mols of an epihalohydrin for every mol of the phenol condensate. The reaction is generally carried out at a temperature within the range from about 50 to 150° C., preferably from about 80 to 130° C., during a period ranging from about 20 minutes to 7 hours, preferably from 30 minutes to 4 hours. The phenol condensates may be prepared by the method described by Daas, Teware and Dutt in Proc. Indian Acad. Sci., 13A, p. 68 (1941) and 14a (1941), namely by reacting a phenol compound of the group of the phenols and the substituted phenols, for example the alkylated and arylated phenols and of the halogenated derivatives of the said compounds with phthalic acid, maleic acid, succinic acid, naphthalenecarboxylic acid or sulphophthalic acid and anhydrides of these acids or substituted derivatives of these acids and anhydrides, for example alkylated or halogenated derivatives. The molecular ratio of the phenol compound to the cyclic compound is at least 2:1. These condensation products have in general the structure

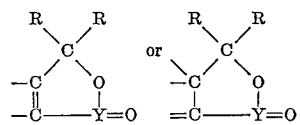

in which formulae R represents a hydroxyphenyl radical or a substituted derivative thereof, for example an alkylated or halogenated derivative, and Y represents a carbon or sulphur atom.

Phenol condensates suitable for use in the process of this invention are, for example, phenolphthalein (reaction product of phenol with phthalic anhydride), cresolphthalein (reaction product of cresol with phthalic anhydride), phenolmalein (reaction product of phenol with maleic anhydride), thymol sulphophthalein (reaction product of thymol with sulphophthalic anhydride), ortho-cresol-sulphophthalein (reaction product of ortho-cresol with sulphophthalic anhydride), cresolmalein (reaction product of cresol with maleic anhydride), phenolsuccinein (reaction product of phenol with succinic anhydride) and phenolnaphthalein (reaction product of phenol with naphthalene carboxylic acid anhydride).

Halohydrins that are suitable for the manufacture of epoxy resins to be used in the process of this invention are epihalohydrins, for example epichlorohydrin.

The epoxy resins manufactured according to the present invention are diglycidyl, polyglycidyl or polyhydroxy ethers and esters of the phenol condensation product.

The molecular weights of the glycidyl ethers and esters differ according to the amount of epihalohydrin used and depend on the reaction conditions employed. When less than an equivalent quantity or almost the equivalent quantity of epihalohydrin is added to a condensation product of a phenol with an anhydride, an epoxy resin of high molecular weight is obtained. When a larger proportion of the epihalohydrin is used, products of lower molecular weights result.

In view of the involved structure of the polymeric epoxy resins to be used according to this invention, it is not possible to define clearly the molecular structure of these polymers.

The curing agents used in the moulding compositions of the present invention are the usual kinds of curing agents, for example polycarboxylic acid anhydrides such as phthalic anhydride, boron trifluoride complexes, chelates containing $BF_2$ groups such as are obtained, for example, by reacting boron trifluoride diethyl etherate with benzoylacetone or acetoacetanilide, as well as polyamines, more especially aromatic polyamines such as ortho-, meta- and para-phenylenediamine, para,para'-diaminodiphenylsulphone, para,para' - diaminodiphenylketone, benzidine and preferably para,para'-diaminodiphenylmethane.

For manufacturing moulding compositions ready for use there may be added to the epoxy resin and curing agent components one or several fillers and/or reinforcing means.

As fillers there may be used inorganic as well as organic substances. As inorganic fillers there may be mentioned quartz meal, mica, aluminium powder, iron oxide, ground chalk, ground slate, unburnt kaolin (bolus alba), burnt kaolin (registered trademark Molochit); as suitable organic fillers there may be mentioned wood meal and cellulose. The amount of fillers incorporated with the moulding compositions varies as a rule from 40 to 212% of the amount of epoxy resin used and depends on the kind of filler and the properties the moulding compositions or the mouldings made therefrom are desired to possess.

Suitable reinforcing means are inorganic fibrous substances, for example glass fibres, asbestos fibres or organic natural or synthetic fibres such as cotton, polyamide, polyester or polyacrylonitrile fibres.

Apart from the fillers there may also be added the known additives and modifiers for moulding compositions such as lubricants, pigments, dyestuffs, curing accelerators, stabilizers, plasticizers or flame-inhibitors.

The moulding compositions of this invention are manufactured by various known methods.

It is possible, for example, to dissolve the epoxy resin and any possible further soluble additives contained in the moulding composition, for example the curing agent, in a solvent such as acetone or dischlorethane and mix the resulting low viscous solution with the remaining insoluble components, such as fillers, pigments and the rest.

Alternatively, a paste may be prepared by heating the epoxy resin/or by adding a small quantity of a suitable liquid to the epoxy resin and any possible further additives and then to incorporate the other components of the moulding composition with the paste.

Finally, it is also possible to dispense entirely with the addition of solvents and to mix the epoxy resin at room temperature, or at an only slightly higher temperature, in the solid state with the other components by the so-called dry method in a suitable mixer, for example in a ball mill.

The choice of the most suitable mixing method is mainly indicated by the fillers and reinforcing means used. For fibrous reinforcing means the wet mixing method is preferred because in this method the initial length of the fibre remains substantially unaffected.

If desired, the moulding compositions of this invention can be made into shapes suitable for charging moulds, such as pellets, tablets or granules.

The flowing property of the moulding compositions described in the following examples was assessed by the following two methods:

(1) MEASURING THE "CUP VALUE"

For the performance of this internally developed testing method 70 g. of the moulding composition were introduced into a cup mould according to DIN 53–465, heated at 165° C., and a test moulding was pressed. With each specimen the following values were measured:

(a) when the specimen had no flask, the average height of the moulding;
(b) when the specimen had a flask, the amount of flask.

A fully moulded cup without flask is given the cup value 7. If the flowability of the moulding composition under the moulding pressure applied does not suffice to fill the mould completely, the average height of the finished moulding is measured by means of an evenly divided scale which starts with zero at the bottom of the cup and whose 7th division coincides with the top edge of the fully moulded cup. Thus, for example, a cup value of 3½ designates a moulding which only half filled the cup mould.

In the case of specimens that have a flask the evaluation takes the following form: The flask is removed and weighed. The cup value (CV) is calculated from the formula $$CV = 7 + \frac{\text{weight of flask in grams}}{2}$$

The maximum value of the cup value scale is 10, corresponding to a flask weighing 6 grams or more.

(2) MEASURING THE MOULD CLOSING TIME ACCORDING TO DIN 53–465

The moulding composition is introduced into a cup mould according to DIN 53–465 heated at 165° C. and the tool is closed. The time from the beginning of the pouring in of the moulding composition to the moment when the pressure begins to rise should then be 15 seconds ±1 second. The speed at which the press plunger travels until it makes contact with the moulding composition should be cm. per second ±0.5 cm. per second.

By means of a stop watch the time is measured from the beginning of the pressure rise (observed on the pressure gauge on the press) until the press plunger comes to a stop, which is observed on an indicator device with lever gearing attached to the press or on a timer.

EXAMPLE 1

A phenolphthalein epoxy resin was prepared in the following manner described in Example 10 of the aforementioned U.S. Pat. No. 3,015,647.

945.9 grams of phenolphthalein (3 mols) were suspended in 2800 g. of epichlorohydrin (30.25 mols) and while being stirred heated to 110° C. in a 3-necked flask. 544.8 grams of an aqueous sodium hydroxide solution (244.8 g. ≙ 6.12 mols of NaOH dissolved in 300 g. of water) were dropped into the reaction mixture at a rate such that during the 4 hours taken by this addition the temperature of the batch remained between 105 and 117° C. During the dropwise addition of the sodium hydroxide solution the azeotropic mixture of water and epichlorohydrin was distilled off and condensed in the receptacle. The upper layer, which consisted mainly of water and a small amount of epichlorohydrin dissolved in it, was decanted and discarded. The bottom layer, which consisted substantially of epichlorohydrin, was returned to the reaction vessel. After the addition of the sodium hydroxide solution the batch was stirred on for half an hour. The faintly yellowish product was filtered off the salt, and the latter was washed with a small amount of benzene and filtered. The filtrates were combined. Benzene, water and a large share of the unreacted epichlorohydrin were removed by distillation at 150° C. under 15 mm. Hg pressure. The last traces of epichlorohydrin were removed by distillation at 166° C. under 2 mm. Hg pressure.

The resulting faintly yellowish resin (1225 g.) had a softening point of 52° C. and contained 3.9 epoxide equivalents per kg. and 2.3% of chlorine.

From this epoxy resin a moulding composition was prepared in the following manner:

631 grams of burnt kaolin (registered trademark Molochit) and 15 g. of glycerol monostearate were turned into a pre-mixture in a Z-blade mixer preheated at 60° C., and then 297 g. of the phenolphthalein epoxy resin described above (containing 3.9 epoxide equivalents per kg., having a softening point of 52° C. and containing 2.3% of chlorine), heated at 80° C. were then added. The three substances were intimately mixed and finally stirred for a short time with 57 g. of 4,4'-diaminodiphenylmethane.

The dough was then stored at room temperature and after sufficient hardening ground to form a coarse granulate.

This moulding composition (moulding composition I) was moulded under a pressure of 25 kg. per square centimeter at 165° C. Shortly after its manufacture the moulding revealed a cup value of 10 and closing time of 2 seconds. After one day's storing at 50° C. no drop in the cup value (10) was observed. The closing time was found to be 12 seconds.

For comparison a moulding composition was prepared in completely identical manner from a conventional epoxy resin based on bisphenol A and epichlorohydrin:

A pre-mixture of 631 g. of Molochit and 15 g. of glycerol monostearate was prepared in a Z-blade mixer preheated at 60° C., and then there were worked in 278 g. of a liquid epoxy resin, preheated at 80° C., which is liquid at room temperature, contains 5.3 epoxide equivalents per kg. and was obtained by condensing bis-(para-hydroxyphenyl)dimethylmethane (=bisphenol A) and epichlorohydrin in the presence of alkali. The three substances were intimately mixed and finally stirred for a short time with 76 g. of 4,4'-diaminodiphenylmethane. Finally, the dough was stored at room temperature until it had hardened sufficiently and then ground to form a coarse granulate.

The freshly prepared moulding composition (moulding composition II) revealed under a pressure of 25 kg./cm.$^2$ and at a press temperature of 165° C. a cup value of 10 and a closing time of 4 seconds. After one day's storing at 50° C., however, it had completely lost its flowability (final values recorded: cup value 1, closing time 100 seconds) in contradistinction to what was observed with moulding composition I.

The properties of the molding composition I according to this invention and of the known moulding composition II, as well as of the products made therefrom, are compared in the following Table I.

As can be seen from this comparison the moulding compositions of this invention combine an unexpectedly long shelf life with further advantages over the known moulding compositions based on conventional epoxy resins (polyglycidyl ether of bisphenol A):

The moulding compositions of this invention suffer less shrinkage during processing, and mouldings made therefrom have a higher heat distortion point (according to Martens, DIN 53-458), a reduced flammability and a higher specific resistance before and after storing in water.

TABLE I

| Property | Testing method | Unit | Moulding comp. I | Moulding comp. II |
| --- | --- | --- | --- | --- |
| Cup value, 25 kg./cm.$^2$ | Internal | Value | 10 | 10 |
| Closing time, 25 kg./cm.$^2$ | DIN 53-465 | Seconds | 2 | 4 |
| After storing for 24 hours at 50° C.: | | | | |
| Cup value, 25 kg./cm.$^2$ | Internal | Value | 10 | 1 |
| Closing time, 25 kg./cm.$^2$ | DIN 53-465 | Seconds | 12 | 100 |
| Mould shrinkage | DIN 53-464 | Percent | 0.52 | 0.85 |
| After shrinkage, 48 hrs./110° C | DIN 53-464 | do | 0.06 | 0.04 |
| After-shrinkage, 168 hrs./ 110° C | DIN 53-464 | do | 0.06 | 0.04 |
| Flexural strength | VSM 77-103 | Kg./mm.$^2$ | 6.7 | 7.9 |
| Impact strength | VSM 77-105 | Cm.kg./cm$^2$ | 2.9 | 3.4 |
| Notched bar impact strength | VSM 77-105 | Cm.kg./cm.$^2$ | 1.2 | 1.6 |
| Martens value | DIN 53-458 | ° C | 143 | 113 |
| Flammability | VDE 1930 | {Stage / Seconds} | 0 / 31 | 0 / >60 |
| Loss factor, $tg\delta$ (50 cps./20° C.) | VDE 0303 | | 0.04 | 0.04 |
| Dielectric constant $\epsilon$ (50 cps./20° C.) | | | 6.0 | 5.9 |
| Spec. resistance, dry | VDE 0303 | Ohm×cm | 16×10$^{14}$ | 1.3×10$^{14}$ |
| After 24 hrs. in H$_2$O at 23° C | | Ohm×cm | 8.8×10$^{14}$ | 6.1×10$^{14}$ |
| Surface resistance, dry | VDE 0303 | Ohm | >10$^{13}$ | >10$^{13}$ |
| After 24 hrs. in H$_2$O at 23° C | | Ohm | 9.5×10$^{12}$ | 6.0×10$^{12}$ |
| Water absorption: | | | | |
| 24 hrs./20° C | VSM-rod (60×10×4 mm.) | Percent | 0.06 | 0.04 |
| 10 mins./100° C | VSM-rod (60×10×4 mm.) | do | 0.04 | 0.05 |

EXAMPLE 2

A moulding composition was prepared exactly as moulding composition I in Example 1, except that glycerol monostearate was replaced by an equal quantity of calcium stearate as lubricant.

This moulding composition (moulding composition III) was likewise moulded under a pressure of 25 kg./cm.$^2$ at 165° C. The flowability of the freshly prepared moulding composition corresponded to the values found for moulding composition I in Example 1 (beaker value 10, closing time 2 seconds). After one day's storing at 50° C. the beaker value had dropped only insignificantly (to 9½). The closing time found was 17 seconds.

For comparison a moulding composition was prepared similar to the known moulding composition II of Example 1, except that glycerol monostearate was replaced by an equal quantity of calcium stearate.

This moulding composition (moulding composition IV) was moulded under a pressure of 25 kg./cm.$^2$ at 165° C. The freshly prepared moulding composition revealed a beaker value of 10 and a closing time of 11 seconds. After one day's storing at 50° C. the moulding composition had lost its flowability almost completely: Beaker value 1½, closing time 65 seconds.

The properties of the new moulding composition III and of the known moulding composition IV, as well as those of the mouldings made therefrom, are compared in the following Table II:

This moulding composition (moulding composition VII) was likewise moulded under a pressure of 25 kg./

TABLE II

| Property | Testing method | Unit | Moulding comp. III | Moulding comp. IV |
|---|---|---|---|---|
| Cup value, 25 kg./cm.$^2$ | Internal | Value | 10 | 10 |
| Closing time, 25 kg./cm.$^2$ | DIN 53-465 | Seconds | 2 | 11 |
| After storing for 24 hours at 50° C.: | | | | |
|   Cup value, 25 kg./cm.$^2$ | Internal | Value | 9½ | 1½ |
|   Closing time, 25 kg./cm.$^2$ | DIN 53-465 | Seconds | 17 | 65 |
| Mould shrinkage | DIN 53-464 | Percent | 0.32 | 0.58 |
| After-shrinkage in 48 hrs./110° C | DIN 53-464 | do | 0.01 | 0.02 |
| After shrinkage, 168 hrs./110° C | DIN 53-464 | do | 0.03 | 0.05 |
| Flexural strength | VSM 77-103 | Kg./mm.$^2$ | 8.0 | 9.3 |
| Impact strength | VSM 77-105 | Cm. kg./cm.$^2$ | 4.4 | 4.6 |
| Notched bar impact strength | VSN 77-105 | Cm. kg./cm.$^2$ | 1.2 | 1.5 |
| Martens value | DIN 53-458 | ° C | 156 | 132 |
| Flammability | VDE 1930 | Stage | 0 | 0 |
| | | Seconds | 24 | >60 |
| Loss factor $tg\delta$ (50 cps./20° C.) | VDE 0303 | | 0.04 | 0.04 |
| Dielectric constant $\epsilon$ (50 cps./20° C.) | | | 5.6 | 6.1 |
| Spec. resistance, dry | VDE 0303 | Ohm×cm | 54×10$^{15}$ | 1.1×10$^{15}$ |
| After 24 hrs. in H$_2$O at 23° C | | Ohm×cm | 2.0×10$^{15}$ | 1.3×10$^{15}$ |
| Surface resistance, dry | VDE 0303 | Ohm | >10$^{13}$ | >10$^{13}$ |
| After 24 hrs. in H$_2$O at /23° C | | Ohm | 1.5×10$^{13}$ | 2.0×10$^{13}$ |
| Water absorption, 24 hrs./20° C | VSM-rod (60×10×4 mm.) | Percent | 0.05 | 0.05 |
| 10 mins./100° C | VSM-rod (60×10×4 mm.) | do | 0.04 | 0.05 |

EXAMPLE 3

Two moulding compositions were prepared exactly as moulding composition I in Example 1, except that burnt kaolin was replaced by an equal quantity of quartz meal as filler (moulding composition V) or an equal quantity of ground chalk as filler (moulding composition VI).

These moulding compositions (moulding compositions V and VI) were likewise moulded under a pressure of 25 kg./cm.$^2$ at 165° C. The flowability of the freshly prepared moulding compositions corresponds to the values found for moulding composition I in Example 1. After one day's storing at 50° C. the cup values of the two moulding compositions have not changed. The properties of the moulding composition V and moulding composition VI are given in the following Table III.

cm.$^2$ at 165° C. The flowability of the freshly prepared moulding composition corresponded to the values found for moulding composition I in Example 1 (cup value 10). After one day's storing at 50° C. the cup value had dropped only to 7¾.

For comparison a moulding composition was prepared similar to the known moulding composition II of Example 1, except that 631 g. of burnt kaolin were replaced by 268 g. of cellulose as filler.

This moulding composition (moulding composition VIII) was moulded under a pressure of 25 kg./cm.$^2$ at 165° C. The freshly prepared moulding composition revealed a cup value of 10 and a closing time of 11 seconds. After one day's storing at 50° C. the moulding compo-

TABLE III

| Property | Testing method | Unit | Moulding comp. V | Moulding comp. VI |
|---|---|---|---|---|
| Cup value, 25 kg./cm.$^3$ | Internal | Value | 10 | 10 |
| Closing time, 25 kg./cm.$^2$ | DIN 53-465 | Seconds | 3 | 1 |
| After storing for 24 hours at 50° C: | | | | |
|   Cup value, 25 kg./cm.$^2$ | Internal | Value | 10 | 10 |
|   Closing time, 25 kg./cm.$^2$ | DIN 53-465 | Seconds | 19 | 30 |
| Mould shrinkage | DIN 53-464 | Percent | 0.50 | 0.57 |
| After shrinkage, 48 hours/110° C | DIN 53-464 | do | 0.03 | 0.01 |
| After shrinkage, 168 hours/110° C | DIN 53-464 | do | 0.05 | 0.02 |
| Flexural strength | VSM 77-103 | Kg./mm.$^2$ | 9.3 | 5.2 |
| Impact strength | VSM 77-105 | Cm.kg./cm.$^2$ | 4.6 | 2.4 |
| Notched bar impact strength | VSM 77-105 | Cm.kg./cm.$^2$ | 1.8 | 1.4 |
| Martens value | DIN 53-458 | ° C | 153 | 138 |
| Flammability | VDE 1930 | Stage | 1 | 1 |
| | | Seconds | 8″ | 7″ |
| Loss factor $tg\delta$ (50 cps./20° C) | VDE 0303 | | 3.2 | 0.65 |
| Dielectric constant | | | 5.0 | 6.4 |
| Spec. resistance, dry | VDE 0303 | Ohm×cm | 7.6×10$^{14}$ | 8.1×10$^{14}$ |
| After 24 hours in H$_2$O at 23° C | | Ohm×cm | 5.0×10$^{14}$ | 2.6×10$^{14}$ |
| Surface resistance, dry | VDE 0303 | Ohm | 7.0×10$^{13}$ | 2.9×10$^{14}$ |
| After 24 hours in H$_2$O at 23° C | | Ohm | 1.5×10$^{14}$ | 7.5×10$^{12}$ |
| Water absorption, 24 hrs./20° C | VSM-rod (60×10×4 mm.) | Percent | 0.05 | 0.07 |
| 10 mins./100° C | VSM-rod (60×10×4 mm.) | do | 0.14 | 0.11 |

EXAMPLE 4

A moulding composition was prepared exactly as moulding composition I in Example 1, except that 631 g. of burnt kaolin were replaced by 190 g. of cellulose as filler.

sition had lost its flowability almost completely: Cup value 0, closing time 110 seconds.

The properties of the new moulding composition VII and of the known moulding composition VIII as well as those of the mouldings made therefrom, are compared in the following Table IV:

TABLE IV

| Property | Testing method | Unit | Moulding comp. VII | Moulding comp. VIII |
| --- | --- | --- | --- | --- |
| Cup value, 25 kg./cm.$^2$ | Internal | Value | 10 | 10 |
| Closing time, 25 kg./cm.$^2$ | DIN 53-465 | Seconds | 23 | 45 |
| After storing for 24 hours at 50° C: | | | | |
| Cup value 25 kg./cm.$^2$ | Internal | Value | 7¾ | 0 |
| Closing time 25 kg./cm.$^2$ | DIN 53-465 | Seconds | 55 | 110 |
| Mould shrinkage | DIN 53-464 | Percent | 0.68 | 0.87 |
| After shrinkage 48 hours/110° C | DIN 53-464 | do | 0.00 | 0.20 |
| After shrinkage 168 hours/110° C | DIN 53-464 | do | 0.16 | 0.31 |
| Flexural strength | VSM 77-103 | Kg./mm.$^2$ | 8.0 | 6.6 |
| Impact strength | VSM 77-105 | Cm.kg./cm.$^2$ | 3.3 | 3.9 |
| Notched bar impact strength | VSM 77-105 | Cm.kg./cm.$^2$ | 1.9 | 2.0 |
| Martens value | DIN 53-458 | ° C | 133 | 97 |
| Flammability | VDE 1930 | Stage | 0 | 0 |
| | | Seconds | >60 | >60 |
| Loss factor, $tg\delta$ (50 cps./20° C.) | VDE 0303 | | 1.20 | 4.80 |
| Dielectric constant | | | 5.9 | 6.7 |
| Spec. resistance, dry | VDE 0303 | Ohm×cm | 1.2×10$^{14}$ | 0.1×10$^{14}$ |
| After 24 hours in H$_2$O at 23° C | | Ohm×cm | 1.8×10$^{10}$ | 1.8×10$^{11}$ |
| Surface resistance, dry | VDE 0303 | Ohm | 8.5×10$^{12}$ | 6.0×10$^{12}$ |
| After 24 hours in H$_2$O at 23° C | | Ohm | 4.9×10$^{10}$ | 6×10$^9$ |
| Water absorption, 24 hours/20° C | VSM-rod (60×10×4 mm.) | Percent | 0.71 | 0.60 |
| 10 mins./100° C | VSM-rod (60×10×4 mm.) | do | 0.61 | 0.58 |

What is claimed is

1. A curable moulding composition comprising (a) a curable 1,2-epoxy resin containing glycidyl groups obtained by reacting in an alkaline medium at a temperature between about 50 to about 150° C. an epihalohydrin with a phenol condensation product selected from the group consisting of phenolphthaleins, phenolmaleins, phenolsucceins and phenolnaphthaleins the molar ratio of epihalohydrin to phenol condensation product being at least 2:1, (b) a curing agent for 1,2-epoxy resins and (c) an inert filler in an amount of from 40% to 212% by weight of epoxy resin.

2. A moulding composition as claimed in claim 1, containing as curing agent (b) an aromatic polyamine.

3. A moulding composition as claimed in claim 2, containing as curing agent p,p′-diaminodiphenylmethane.

4. A moulded article which has been obtained by subjecting in a mould to heat and pressure a curable composition comprising (a) a curable, 1,2-epoxy resin containing glycidyl groups obtained by reacting in an alkaline medium at a temperature between about 50 to about 150° C. an epihalohydrin with a phenol condensation product selected from the group consisting of phenolphthaleins, phenolmaleins, phenolsucceins and phenolnaphthaleins the molar ratio of epihalohydrin to phenol condensation product being at least 2:1, (b) a curing agent for 1,2-epoxy resins and (c) an inert filler in an amount of from 40% to 212% by weight of epoxy resin.

References Cited

UNITED STATES PATENTS 2,773,048  12/1956  Formo et al.
3,015,647  1/1962  Lo.

WILLIAM H. SHORT, Primary Examiner

T. E. PERTILLA, Assistant Examiner

U.S. Cl. X.R.

260—9, 47